US010883897B2

(12) United States Patent
Kopecek et al.

(10) Patent No.: US 10,883,897 B2
(45) Date of Patent: Jan. 5, 2021

(54) DATA ACQUISITION METHOD

(71) Applicant: INNIO Jenbacher GmbH & Co OG, Tirol (AT)

(72) Inventors: Herbert Kopecek, Tirol (AT); Klaus Zoeggeler, Tirol (AT); Markus Kroell, Tirol (AT); Thomas Weitzer, Tirol (AT); Moritz Froehlich, Tirol (AT)

(73) Assignee: INNIO Jenbacher GmbH & Co OG, Jenbach (AT)

( * ) Notice: Subject to any disclaimer, the term of this patent is extended or adjusted under 35 U.S.C. 154(b) by 181 days.

(21) Appl. No.: 15/745,516

(22) PCT Filed: Jul. 14, 2016

(86) PCT No.: PCT/AT2016/060007
§ 371 (c)(1),
(2) Date: Jan. 17, 2018

(87) PCT Pub. No.: WO2017/011846
PCT Pub. Date: Jan. 26, 2017

(65) Prior Publication Data
US 2018/0209871 A1 Jul. 26, 2018

(30) Foreign Application Priority Data
Jul. 23, 2015 (AT) ..................................... 489/2015

(51) Int. Cl.
*G01M 15/08* (2006.01)
*F02D 41/00* (2006.01)
(Continued)

(52) U.S. Cl.
CPC ........... *G01M 15/08* (2013.01); *F02D 41/009* (2013.01); *F02D 41/28* (2013.01); *G01L 19/083* (2013.01);
(Continued)

(58) Field of Classification Search
None
See application file for complete search history.

(56) References Cited

U.S. PATENT DOCUMENTS 4,086,888 A * 5/1978 Roberts .................. B60K 31/10
123/352
5,229,945 A 7/1993 Demizu et al.
(Continued)

FOREIGN PATENT DOCUMENTS

| CN | 102003298 A | 4/2011 |
| DE | 10157680 A1 | 6/2003 |

(Continued)

OTHER PUBLICATIONS

First Office Action and Search issued in connection with corresponding AT Application No. A489/2015 dated Jul. 25, 2016.
(Continued)

*Primary Examiner* — Roy Y Yi
(74) *Attorney, Agent, or Firm* — Fletcher Yoder, P.C.

(57) ABSTRACT

A method for transmitting the cylinder pressure data of a plurality of cylinder pressure sensors to a central processing unit, characterized by the use of a communication system for isochronous data transmission comprising a data bus, whereby the plurality of cylinder pressure sensors and the central processing unit are connected via the data bus, whereby each of the plurality of cylinder pressure sensors are combined with a data acquisition unit and a data communication unit to form a measurement node, whereby the cylinder pressure data is transmitted from the measurement node to the central processing unit via a time-slot method.

20 Claims, 4 Drawing Sheets

(51) Int. Cl.
  *F02D 41/28* (2006.01)
  *G10L 19/08* (2013.01)
  *F02D 35/02* (2006.01)
  *H04L 12/40* (2006.01)
  *G01L 19/08* (2006.01)
  *G01D 5/00* (2006.01)

(52) U.S. Cl.
  CPC ............ H04L 12/40 (2013.01); *F02D 35/023* (2013.01); *F02D 2041/281* (2013.01); *F02D 2250/14* (2013.01); *G01D 5/00* (2013.01); *H04L 2012/40215* (2013.01); *H04L 2012/40273* (2013.01)

(56) References Cited

U.S. PATENT DOCUMENTS

| | | | |
|---|---|---|---|
| 5,359,883 A | | 11/1994 | Baldwin et al. |
| 5,623,412 A | * | 4/1997 | Masson ................ F02B 77/087 123/406.34 |
| 6,195,597 B1 | * | 2/2001 | Yamada ................ G06F 1/3228 455/550.1 |
| 6,567,709 B1 | | 5/2003 | Malm et al. |
| 6,827,061 B2 | | 12/2004 | Nytomt et al. |
| 8,375,776 B2 | | 2/2013 | Tugnolo et al. |
| 8,528,521 B2 | | 9/2013 | Landsmann et al. |
| 8,844,496 B2 | * | 9/2014 | Polgar ................ F02B 19/1095 123/256 |
| 2006/0282598 A1 | | 12/2006 | Takeuchi |
| 2014/0046574 A1 | | 2/2014 | Eisenbarth et al. |

FOREIGN PATENT DOCUMENTS

| | | |
|---|---|---|
| DE | 102005056963 A1 | 6/2007 |
| DE | 102005060665 A1 | 6/2007 |
| DE | 10 2010 027 167 B4 | 8/2012 |
| EP | 1 798 936 A1 | 6/2007 |
| WO | 2004/068346 A1 | 8/2004 |

OTHER PUBLICATIONS

PCT International Search Report and Written Opinion; Application No. PCT/AT2016/060007; dated Jan. 2, 2017; 13 pages.

* cited by examiner

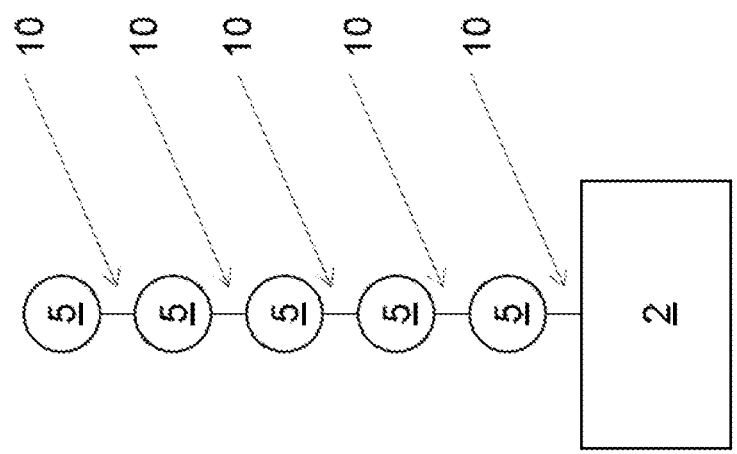

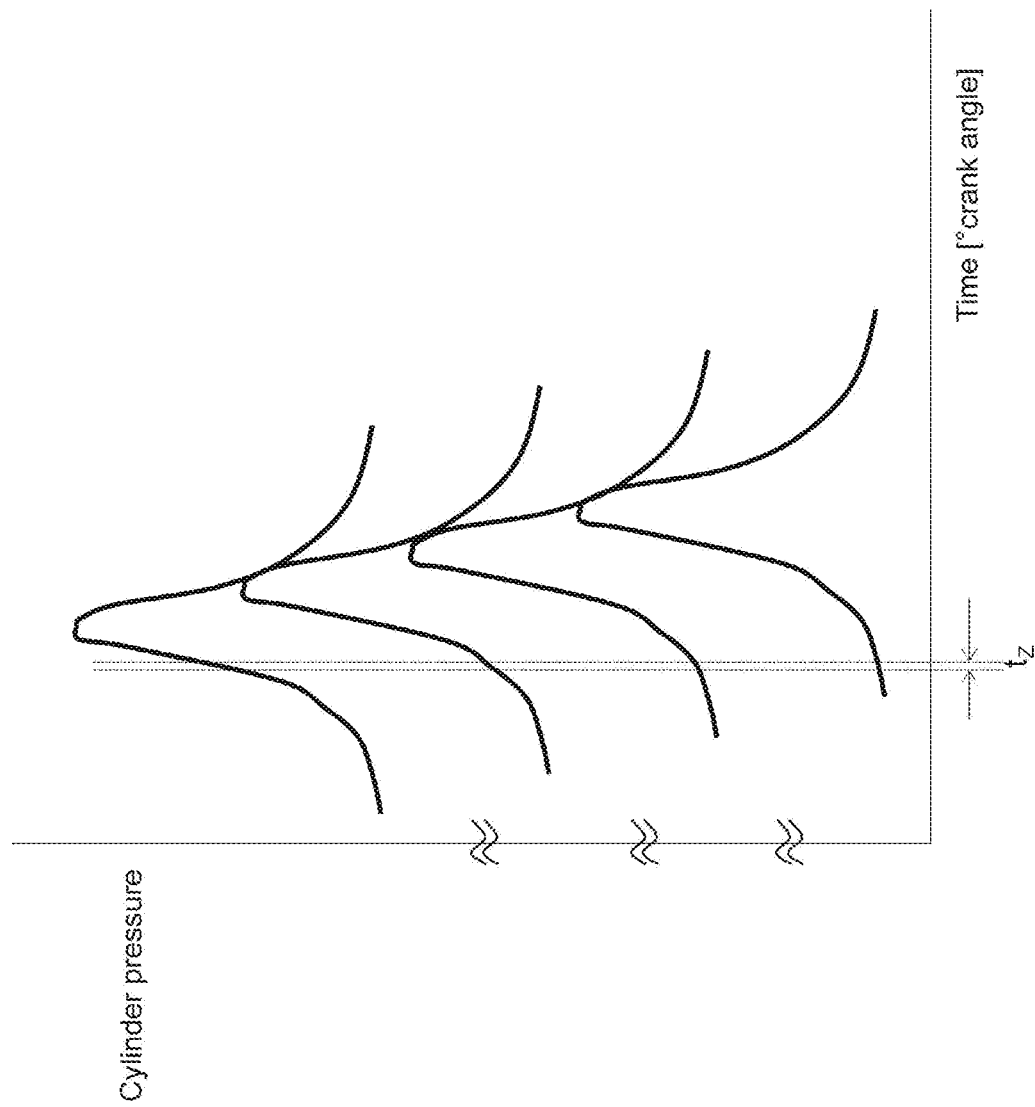

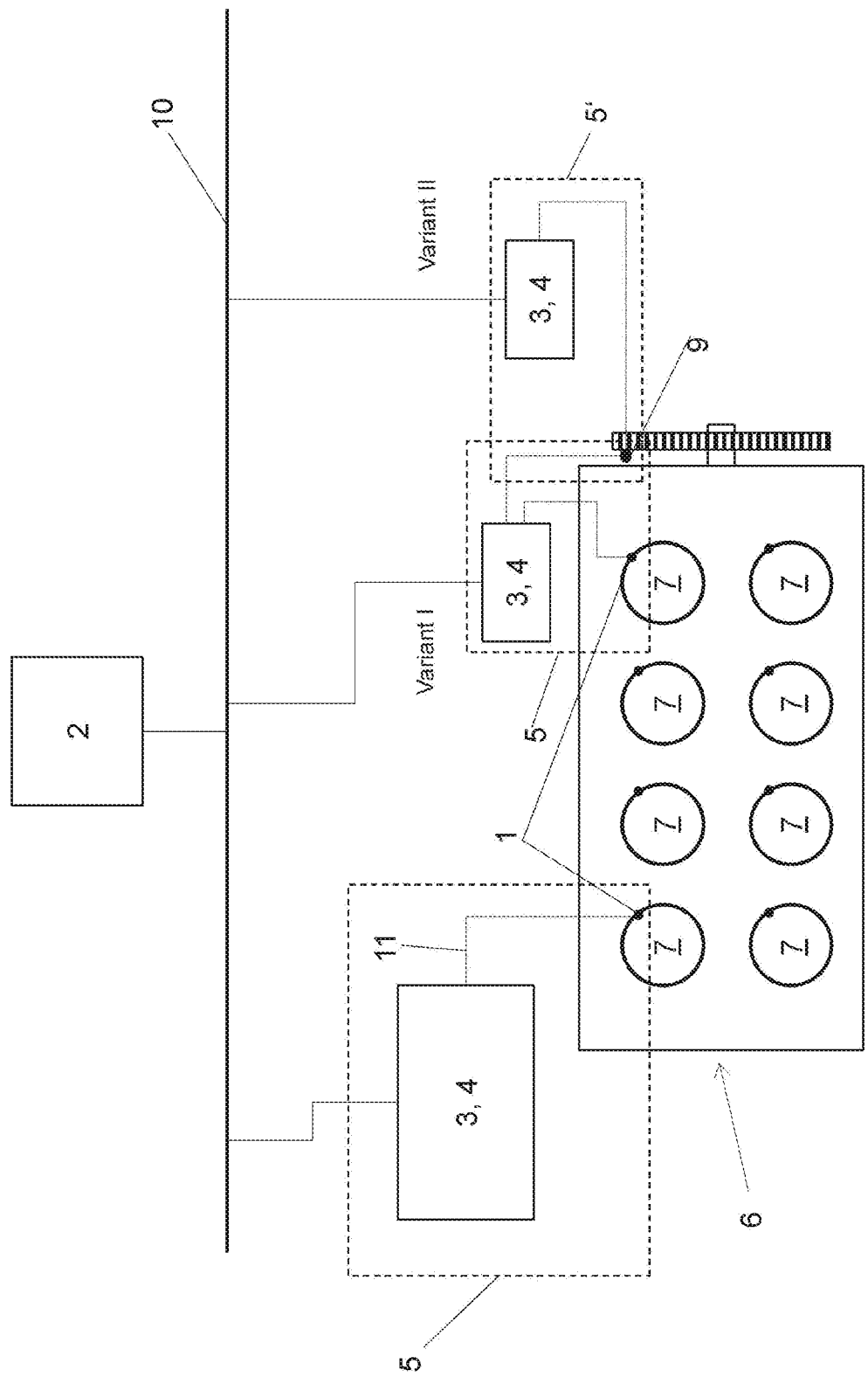

DATA ACQUISITION METHOD

TECHNOLOGY FIELD

This disclosure relates to a method for data acquisition of measured values of a cylinder pressure measurement.

BACKGROUND

Various methods for data acquisition and data processing of measured values of motorized quantities are known from the prior art.

The measured values, for example the results of a cylinder pressure measurement, are transmitted by individual signal lines from the sensors to a central processing unit, for example the engine control. This is known, for example, from the patent specifications CN 102003298, U.S. Pat. Nos. 8,528,521 B2, 8,375,776 B2, 6,827,061 B2, 6,567,709 B1, 5,359,883 A, and 5,229,945 A.

Another approach known from the prior art for processing cylinder pressure data is a decentralized evaluation. According to this, the measured values are not transmitted to a central processing unit at all.

SUMMARY OF THE DISCLOSURE

This disclosure provides an improved method for transmitting cylinder pressure data to a central processing unit.

By using a communication system for isochronous data transmission, to which the cylinder pressure sensors and the central processing unit are connected via a data bus, whereby each of the plurality of cylinder pressure sensors together with a data acquisition unit and a data communication unit are combined to form a measurement node, whereby the cylinder pressure data is transmitted from the measurement nodes to the central processing unit via time-slot-based communication, less wiring is required (in the ideal case, a single line is sufficient) and the communication time is reduced compared to the prior art. As a result, a faster response to irregularities in the cylinder pressure curve is possible.

The cylinder pressure sensors are arranged in individual cylinders of an internal combustion engine. They can be pressure transducers or other sensors that can generate a characteristic magnitude for the cylinder pressure. Not all cylinders need to be equipped with cylinder pressure sensors, but in an embodiment all cylinders are equipped with cylinder pressure sensors. Not all cylinder pressure sensors need to be combined together with a data acquisition unit and a data communication unit to form a measurement node, but this is preferably the case.

In an embodiment, the communication system is in the form of a wired network.

A suitable communication system for isochronous data transmission, known as a time-triggered hard real-time network, is given for example in DE 10 2010 027167 B4. The participants in the communication system (measurement node, central processing unit) are equipped with clocks for this purpose. A clock synchronization of the participants in the communication system to fulfill the real-time requirements of the communication system can be performed, for example, according to IEEE 1588 or another suitable standard. For this purpose, the cycle time is in an embodiment selected so as to be much smaller (i.e. approximately by a factor of 50) than the minimum achievable period (corresponding to the maximum speed) of one revolution of the internal combustion engine.

The advantage of using a time-slot method is, in particular, that the communication (the data transmission of the measured values of the cylinder pressure sensors) takes place within a defined time window. This creates the possibility of an evaluation in real time in order to guarantee defined communication latencies and thus reaction times.

In the cycle time of the communication system, each cylinder pressure sensor transmits the cylinder pressure values recorded by it in this time span via the communication network to the central processing unit. Individual curve sections of the cylinder pressure curve of the respective cylinder are thus transmitted.

According to the invention, the cylinder pressure data is distributed in a common communication system based on time, collected at the central processing unit and combined there into the cylinder pressure curves.

The data is thus recorded via measurement nodes and stored there until the cycle time has expired and the stored data is sent to the central processing unit via a common time-based communication system. For this purpose, only one signal connection, e.g. a cable, is required.

The evaluation of the cylinder pressure data is staggered over time and cylinder-specific (i.e. the evaluation time and the curve section to be evaluated can be set differently for each cylinder).

The assignment of the data segments to the respective crank angle range (indexation) can be performed by measuring the crank angle at a single node. This measurement is transmitted to the central processing unit. In other words, for each crank angle, the data segments of all nodes reach the central processing unit in a predetermined sequence, so only a "timestamp" is required to know which crank angle the data segments belong to. It may also be provided to perform the measurement of the crank angle at two or more nodes.

BRIEF DESCRIPTION OF THE DRAWINGS

In an embodiment explained in more detail with reference to the following figures. The drawings in detail:

FIG. 2 is a schematic representation of the arrangement of the measurement nodes in a topology according to a preferred exemplary embodiment;

FIG. 3 is a schematic representation of cylinder pressure curves of an internal combustion engine to illustrate the cycle time; and FIG. 4 is a diagram of an internal combustion engine.

DETAILED DESCRIPTION

Figure 1A:
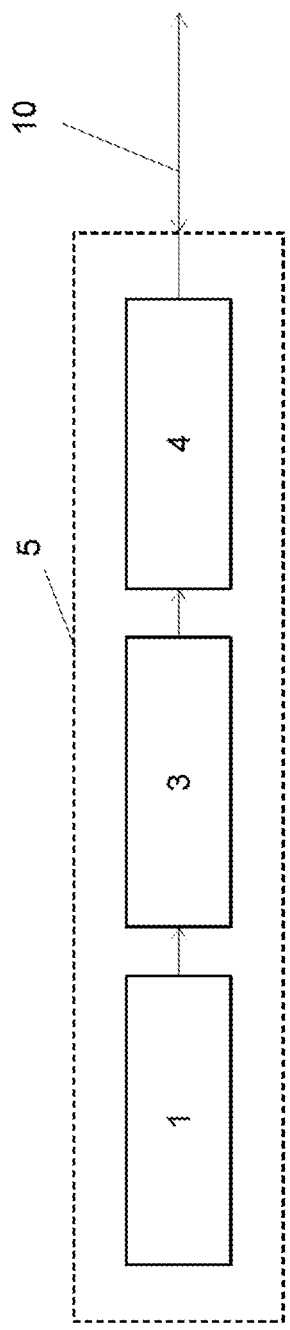
FIGS. 1A, 1B, and 1C are diagrams of the logical units combined in measurement nodes.

FIG. 1A shows in a schematic representation that the cylinder pressure sensor 1, the data acquisition unit 3 and the data communication unit 4 are functionally combined to form a measurement node 5. The cylinder pressure sensor 1 measures cylinder pressure signals. The data acquisition unit 3 digitizes the cylinder pressure signals and stores them. The data communication unit 4 provides the digitized stored signals as data packets to the data bus 10 according to a time-slot method. The components can be structurally combined or also arranged separately from one another (only combined as logical units).

Figure 1B:
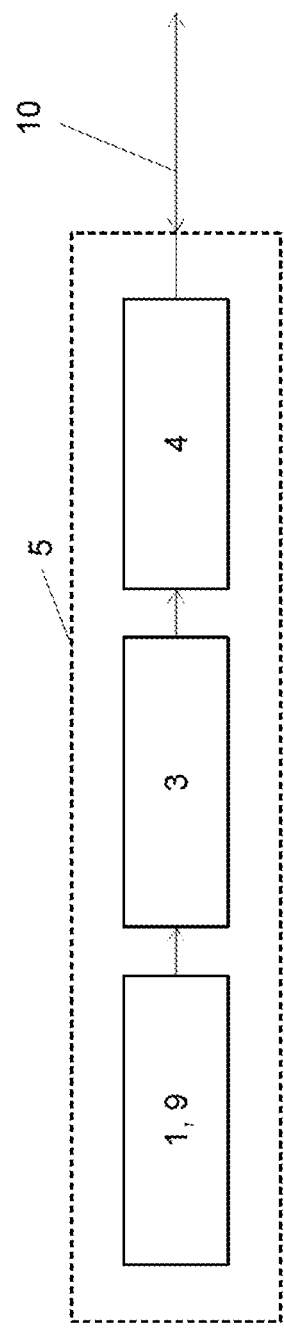

FIG. 1B shows the variant in which a pick-up 9 for providing crank angle information is also included in the measurement node 5.

The data acquisition unit 3 can thus process cylinder pressure signals and/or crank angle information.

Figure 1C:
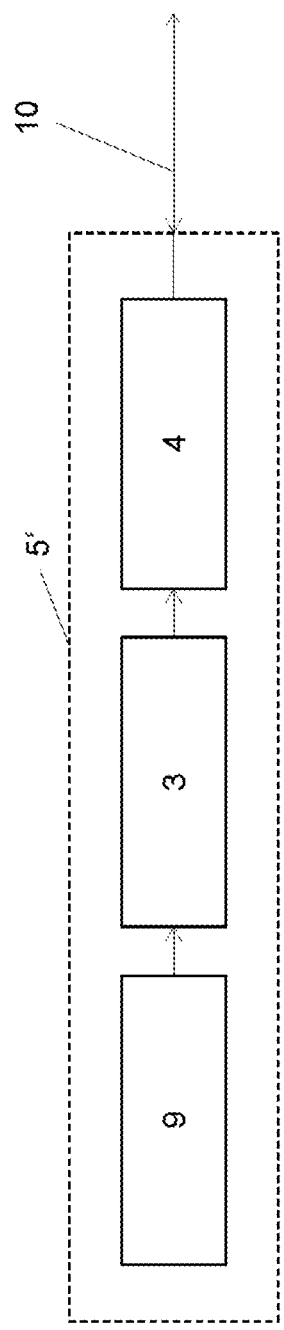

FIG. 1C shows a diagram of a crank angle measurement node 5', which does not process any cylinder pressure signals, but only crank angle information from the pick-up 9.

FIG. 2 shows the arrangement of measurement nodes 5 and a central processing unit 2 in a preferred exemplary embodiment. The topology is designed here as a so-called line topology, i.e. the logical or physical units, in this case the measurement nodes 5, are in a serial communication connection with the central processing unit 2. Different topologies of the data bus 10 between the measurement nodes 5 are of course also possible, for example a star topology or a ring topology. The data packets are forwarded by the individual measurement nodes 5 via a common line to the central processing unit 2.

FIG. 3 shows the cylinder pressure curve plotted over the crankshaft angle for four cylinders of an internal combustion engine. The representation serves to illustrate the cycle time $t_z$ during which cylinder pressure data is recorded via the measurement node 5 and stored there until the cycle time $t_z$ has elapsed.

As soon as the cycle time $t_z$ has elapsed, the data packets are made available to the data bus 10 according to the time-slot method.

A time-slot method is a modulation method in which the information of a participant is sent only in short time periods. A time slot is thus a time period of predetermined length within which a participant in a network can provide information. Applied to this invention, the time slot corresponds to the cycle time $t_z$ in which measured values of the cylinder pressure are transmitted by the individual cylinder pressure sensors 1. For a given length of the cycle time $t_z$ it depends on the current speed of the internal combustion engine and the resolution of the crankshaft angle signal, how many data points are acquired within a cycle time $t_z$.

It is in an embodiment provided that the cycle time $t_z$ of the time-slot method is selected to be smaller, in an embodiment approximately 50 times smaller than the minimum achievable period of one revolution of an internal combustion engine 6 corresponding to the maximum speed of the internal combustion engine 6. From the speed of an internal combustion engine 6, it is easy to calculate the period (duration) of one revolution. For example, if the speed is 1,000 rpm$^{-1}$, then the period is 60/100 seconds or 60 ms (milliseconds) long. A suitable cycle time $t_z$ of the time-slot method would therefore be 60/50=1.2 ms long.

In the invention, the cylinder pressure data is distributed in a common communication system based on time, collected at the central processing unit 2 and combined there into the cylinder pressure curves. In the cycle time $t_z$ (=time required to interrogate all the measurement nodes 5) of the communication system, each cylinder pressure sensor 1 transmits the information (curve section) recorded by it in this time span via the communication network to the central processing unit 2.

FIG. 4 shows a schematic representation of an internal combustion engine 6 with a plurality of the cylinders 7. The cylinders 7 are each equipped with at least one cylinder pressure sensor 1, from which cylinder pressure values are first transferred via a signal line 11 from the cylinder pressure sensor 1 to a data acquisition unit 3 and a data communication unit 4. This is shown by way of example in a cylinder 7.

The cylinder pressure values are collected via the data acquisition unit 3 and the data communication unit 4 in a measurement node 5. The measurement node 5 is shown as a dashed box. The individual measurement nodes 5 are connected to a data bus 10. As an example, it is shown that a measurement node 5 is assigned to exactly one cylinder pressure sensor 1. It can also be provided that a plurality of cylinder pressure sensors 1 are combined in a measurement node 5. It has been found to be particularly advantageous to combine two adjacent cylinder pressure sensors 1 in a measurement node 5. To a crankshaft of the internal combustion engine 6, a ring gear is connected, on which a pick-up 9 for recording crank angle information (speed, crank angle) is arranged.

It can be provided (illustrated as variant I) that the pick-up 9 transmits the crank angle information to a measurement node 5. In this variant, the measurement node 5 comprises the cylinder pressure sensor 1, the data acquisition unit 3, the data communication unit 4 and the pick-up 9.

According to variant II, the pick-up 9 can transmit the crank angle information to a crank angle measurement node 5' which does not process cylinder pressure values from a cylinder pressure sensor 1.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A method for transmitting cylinder pressure data of a plurality of cylinder pressure sensors to a central processing unit, the method comprising: using a communication system for isochronous data transmission comprising connecting the plurality of cylinder pressure sensors and the central processing unit via a data bus; combining each of the plurality of cylinder pressure sensors with a data acquisition unit and a data communication unit to form a measurement node; and transmitting the cylinder pressure data from the measurement node to the central processing unit via a time-slot method, wherein a cycle time of the time-slot method is selected to be smaller than a minimum achievable period of an internal combustion engine corresponding to a maximum speed of the internal combustion engine.

2. The method according to claim 1, wherein the communication system is a wired network.

3. The method according to claim 1, wherein the cycle time of the time-slot method is selected to be at least 50 times smaller than the minimum achievable period of the internal combustion engine corresponding to the maximum speed of the internal combustion engine.

4. The method according to claim 1, wherein evaluation of the cylinder pressure data is staggered in time and cylinder-specific.

5. The method according to claim 1, wherein assignment of data segments of the cylinder pressure data to a respective crank angle range is performed by measuring crank angle at a single measurement node.

6. A communication system for isochronous data transmission comprising:
a plurality of cylinders in an internal combustion engine;
a plurality of cylinder pressure sensors;
a data acquisition unit;
a data communication unit;

a measurement node formed by combining the plurality of cylinder pressure sensors with the data acquisition unit and the data communication unit;

a data bus; and a central processing unit operable to receive cylinder pressure data from the measurement node via a time-slot method, with the central processing unit and the plurality of cylinder pressure sensors connected via the data bus, wherein a cycle time of the time-slot method is selected to be smaller than a minimum achievable period of an internal combustion engine corresponding to a maximum speed of the internal combustion engine.

7. The system of claim 6, wherein the system is a wired network.

8. The system of claim 6, wherein the cylinder pressure data is cylinder specific.

9. The system of claim 6, wherein the system is a single line wired network.

10. The system of claim 6, wherein the system is a time-triggered hard real-time network.

11. The system of claim 6, wherein the measurement node and the central processing unit are each equipped with clocks.

12. The system of claim 6, further comprising a ring gear connected to a crankshaft of the internal combustion engine, with a pick-up arranged on the ring gear operable to record crank angle information.

13. A system, comprising:

a central processing unit of an internal combustion engine, wherein the central processing unit is operable to receive cylinder pressure data via a time-slot method, wherein a cycle time of the time-slot method is smaller than a revolution of the internal combustion engine corresponding to a maximum speed of the internal combustion engine.

14. The system of claim 13, comprising:

a pressure sensor for each cylinder of the internal combustion engine;

a data acquisition unit;

a data communication unit; and a measurement node formed by combining each pressure sensor with the data acquisition unit and the data communication unit, wherein the central processing unit is operable to receive the cylinder pressure data from the measurement node via the time-slot method.

15. The system of claim 13, comprising the internal combustion engine having the central processing unit.

16. The system of claim 15, wherein the internal combustion engine comprises a plurality of cylinders and a plurality of pressure sensors, and the central processing unit is operable to receive the cylinder pressure data for the plurality of cylinders with the plurality of sensors via the time-slot method.

17. The system of claim 15, comprising a ring gear connected to a crankshaft of the internal combustion engine, with a pick-up arranged on the ring gear operable to record crank angle information.

18. The system of claim 13, wherein the cylinder pressure data is cylinder specific.

19. The system of claim 13, wherein the cycle time is equal to a duration of the revolution of the internal combustion engine corresponding to the maximum speed of the internal combustion engine divided by a value greater than one, wherein the value is selected up to about 50.

20. The system of claim 13, wherein the cycle time is at least approximately 50 times smaller than the revolution of the internal combustion engine corresponding to the maximum speed of the internal combustion engine.

* * * * *